US010520241B1

(12) United States Patent
Nelson

(10) Patent No.: US 10,520,241 B1
(45) Date of Patent: Dec. 31, 2019

(54) DRIP TRAY FOR A SNOW BLOWER

(71) Applicant: John Nelson, Flossmoor, IL (US)

(72) Inventor: John Nelson, Flossmoor, IL (US)

( * ) Notice: Subject to any disclaimer, the term of this patent is extended or adjusted under 35 U.S.C. 154(b) by 100 days.

(21) Appl. No.: 15/689,101

(22) Filed: Aug. 29, 2017

(51) Int. Cl.
*F16N 31/00* (2006.01)
*F25D 21/14* (2006.01)
*B08B 17/02* (2006.01)

(52) U.S. Cl.
CPC ............ *F25D 21/14* (2013.01); *B08B 17/025* (2013.01)

(58) Field of Classification Search
CPC ..... F25D 21/14; B08B 17/025; F16N 31/006; F16N 31/00
USPC ........... 296/38; 180/69.1; 220/573; 137/312; 134/104.2, 123
See application file for complete search history.

(56) References Cited

U.S. PATENT DOCUMENTS

D242,136 S * 11/1976 Matlock ........................ D12/425
4,246,982 A * 1/1981 Pretnick ................ F16N 31/004 180/69.1
4,826,030 A 5/1989 Valley
4,903,723 A * 2/1990 Sublett .................. A47L 15/421 137/312
5,020,638 A 6/1991 Smith
D353,505 S 12/1994 Rea
5,478,625 A 12/1995 Wright
5,916,658 A 6/1999 Mohr
6,106,712 A 8/2000 New
6,120,876 A * 9/2000 Walton .................. F16N 31/006 180/69.1
6,558,769 B1 5/2003 Chwala
9,506,264 B1 11/2016 Hyman
2015/0375983 A1* 12/2015 Code ..................... B08B 17/025 137/312

* cited by examiner

*Primary Examiner* — Andrew T Kirsch
*Assistant Examiner* — Elizabeth J Volz

(57) ABSTRACT

The drip tray for a snow blower comprises a drip tray and a ramp. The ramp allows the snow blower to be pushed or propelled to the drip tray and the drip tray collects melt water originating at the snow blower. Melt water may be contained within the drip tray by three walls of the drip tray, an elevation of a portion of the ramp, and/or an inclination of the drip tray floor. In some embodiments, the drip tray may comprise a plurality of drain holes in the drip tray floor and a water reservoir under the drip tray floor for collecting the melt water.

14 Claims, 5 Drawing Sheets

DRIP TRAY FOR A SNOW BLOWER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of snow removal equipment, more specifically, a drip tray for a snow blower.

Snow blowers are machines that are pushed through fallen snow to remove the snow. Snow blowers generally use the rotary motion of one or more blades to force the snow into a chute. The rapid motion of the blades causes the snow to move with such velocity that the snow is forcefully ejected from the top of the chute. Generally the top of the chute is curved and can be aimed to point the ejected snow to an area where the snow may accumulate without causing issues.

Snow blowers are frequently stored in the garage or storage shed of a residence. When a snow blower is returned to its assigned spot in the garage or shed it may have snow and ice the snow blower engine and the fact that the storage area may be warmer than the outdoor temperature, the snow and ice on the snow blower may melt and the melt water may drip off of the snow blower. This melt water may cause problems, especially if the snow or ice was contaminated by de-icing salt. Repeated use of the snow blower and repeated melting cycles may cause damage to the garage or shed floor, to walls close enough to have melt water reach them, and to nearby object such as bags of de-icing salt.

SUMMARY OF INVENTION

The drip tray for a snow blower comprises a drip tray and a ramp. The ramp allows the snow blower to be pushed or propelled to the drip tray and the drip tray collects melt water originating at the snow blower. Melt water may be contained within the drip tray by three walls of the drip tray, an elevation of a portion of the ramp, and/or an inclination of the drip tray floor. In some embodiments, the drip tray may comprise a plurality of drain holes in the drip tray floor and a water reservoir under the drip tray floor for collecting the melt water.

An object of the invention is to collect melt water from a snow blower that is parked on a drip tray.

Another object of the invention is to provide a ramp that allows the snow blower to enter the drip tray without allowing melt water to escape from the drip tray.

A further object of the invention is to provide a water reservoir under the drip tray to retain the melt water.

Yet another object of the invention is to provide a drain aperture and drain plug to allow the water reservoir to be emptied.

These together with additional objects, features and advantages of the drip tray for a snow blower will be readily apparent to those of ordinary skill in the art upon reading the following detailed description of the presently preferred, but nonetheless illustrative, embodiments when taken in conjunction with the accompanying drawings.

In this respect, before explaining the current embodiments of the drip tray for a snow blower in detail, it is to be understood that the drip tray for a snow blower is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the drip tray for a snow blower.

It is therefore important that the claims be regarded as including such equivalent construction insofar as they do not depart from the spirit and scope of the drip tray for a snow blower. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. As used herein, the word "level" refers to a height above a surface which may or may not include the thickness of a material. As a non-limiting example, to say that "a ramp begins at the level of the floor" may mean that the beginning of the ramp rests on the floor and therefore the top side of the beginning of the ramp is the thickness of the ramp above the floor. As a further non-limiting example, to say that "the ramps ends at the level of a platform" may mean that the end of the ramp is at a height which substantially matches the height of the platform. As used herein, the word "substantially" may indicate that two values are the same except for a margin of error related to variances in materials, craftsmanship, installation, environmental conditions, and other factors that may influence the values.

Figure 1:
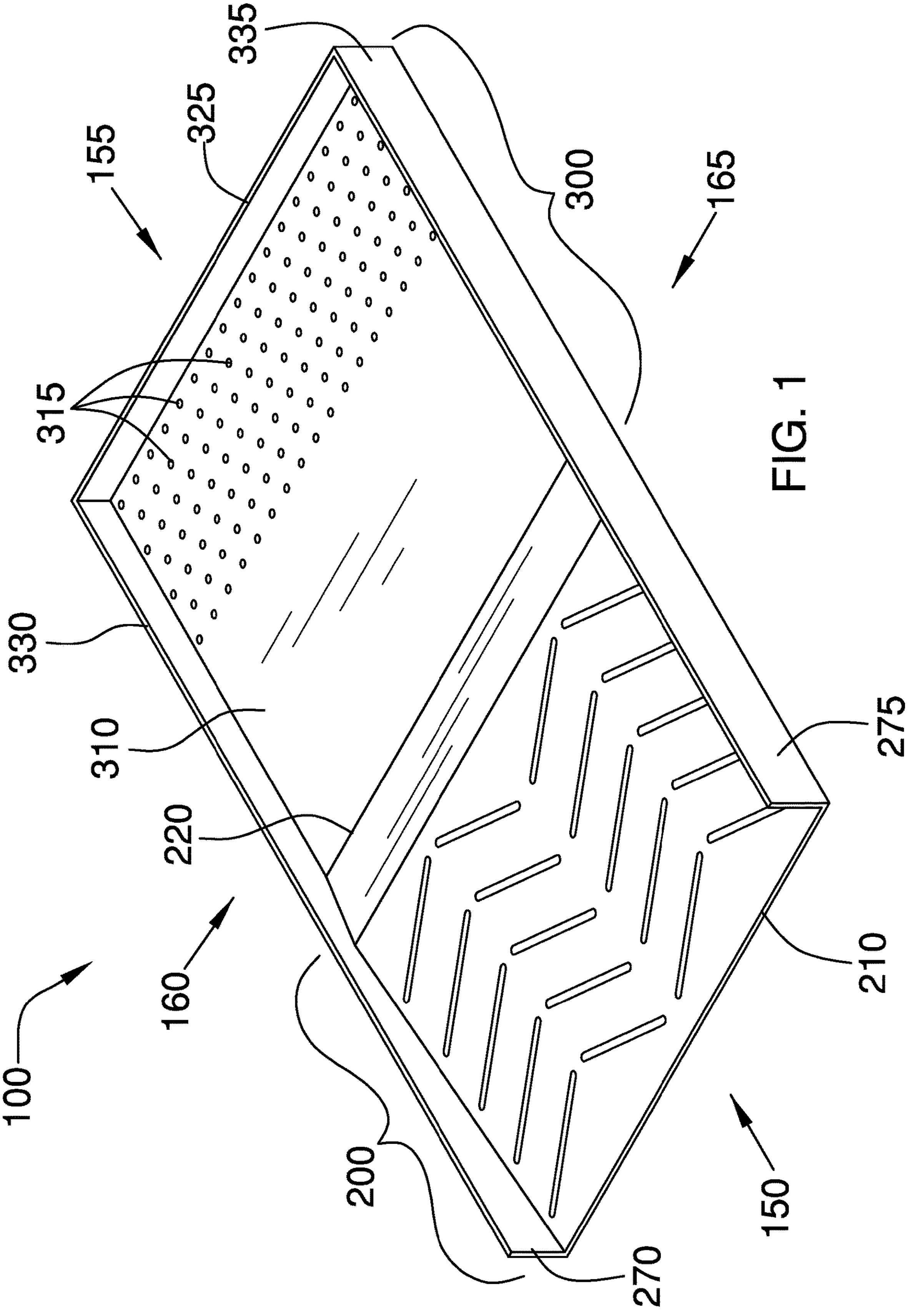
FIG. 1 is a perspective view of an embodiment of the disclosure.
Figure 2:
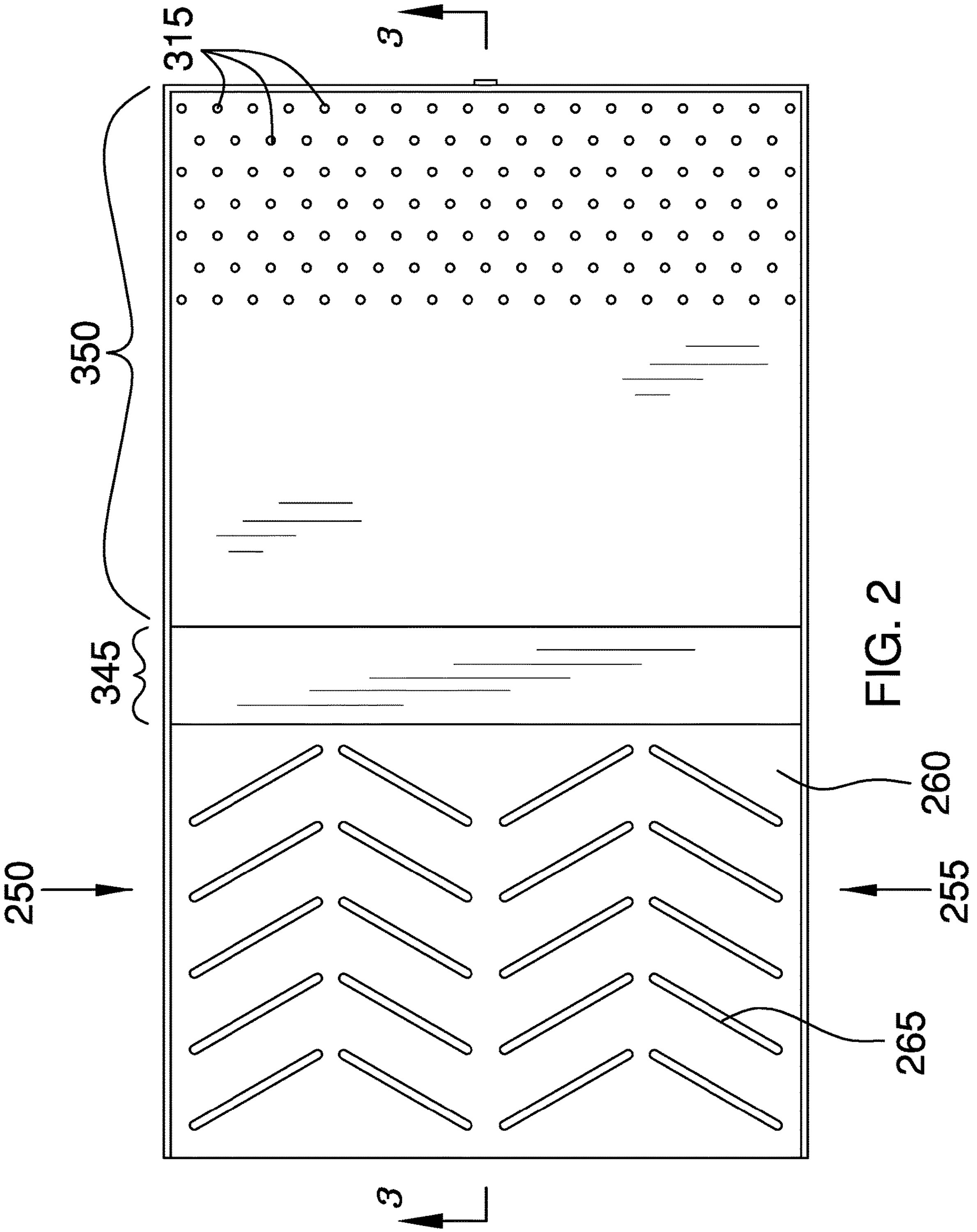
FIG. 2 is a top view of an embodiment of the disclosure.
Figure 3:
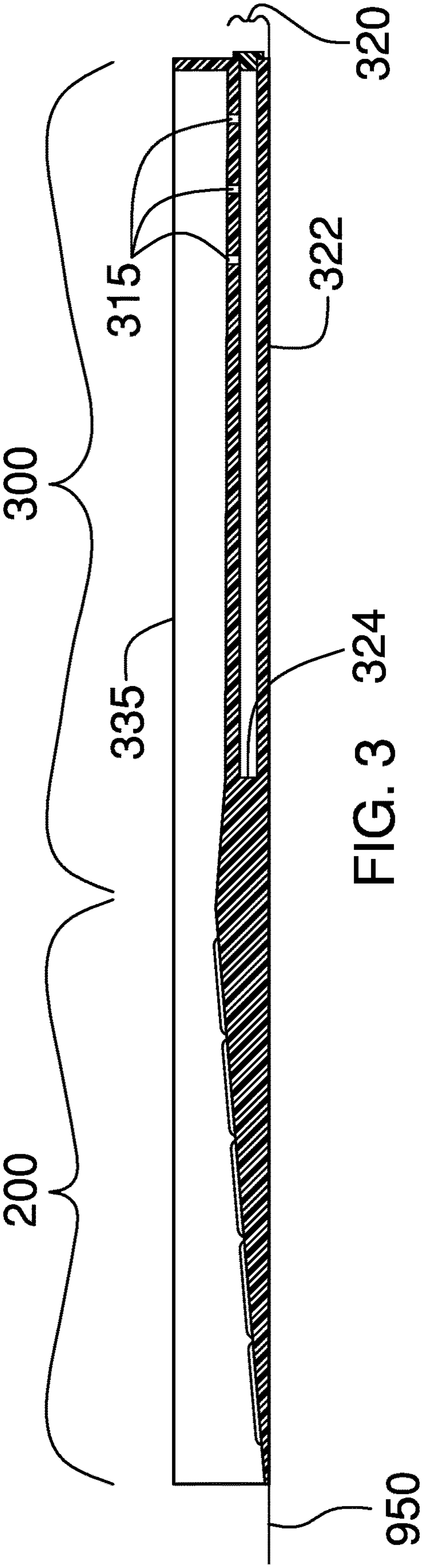
FIG. 3 is a cross-sectional view of an embodiment of the disclosure across 3-3 as shown in FIG. 2.
Figure 4:
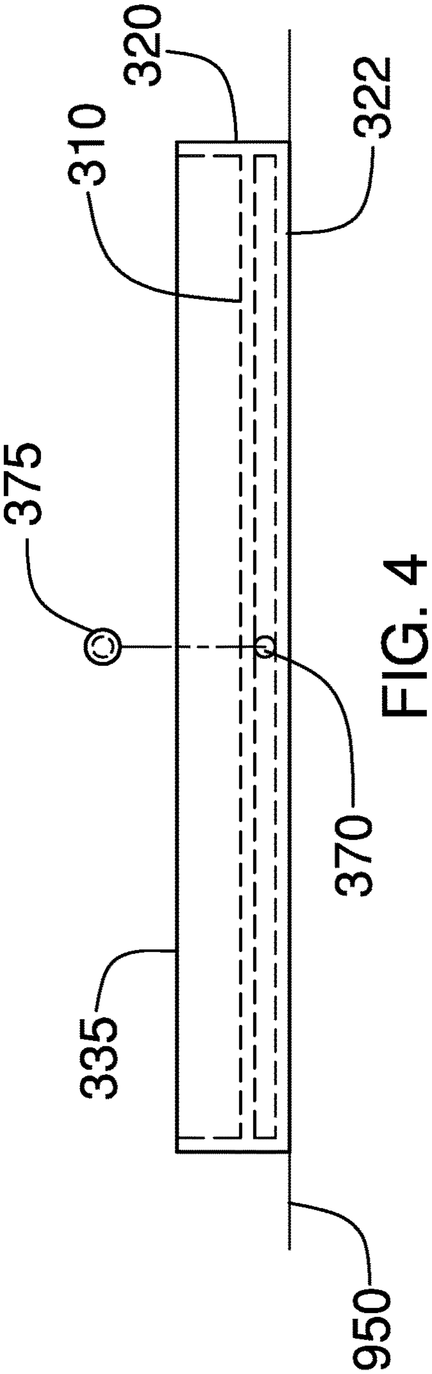
FIG. 4 is a rear view of an embodiment of the disclosure.
Figure 5:
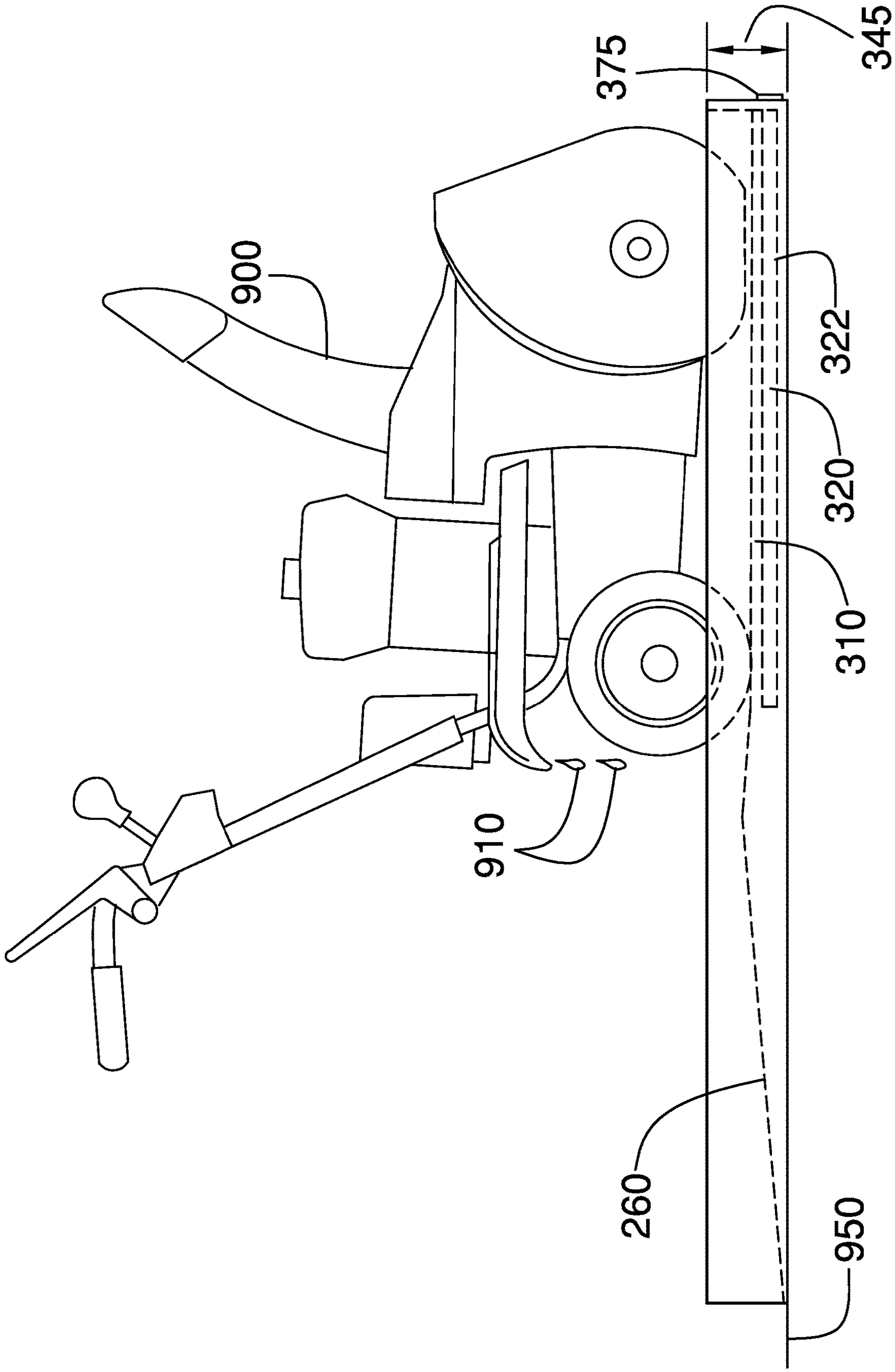
FIG. 5 is a side view of an embodiment of the disclosure showing use.
Figure 6:
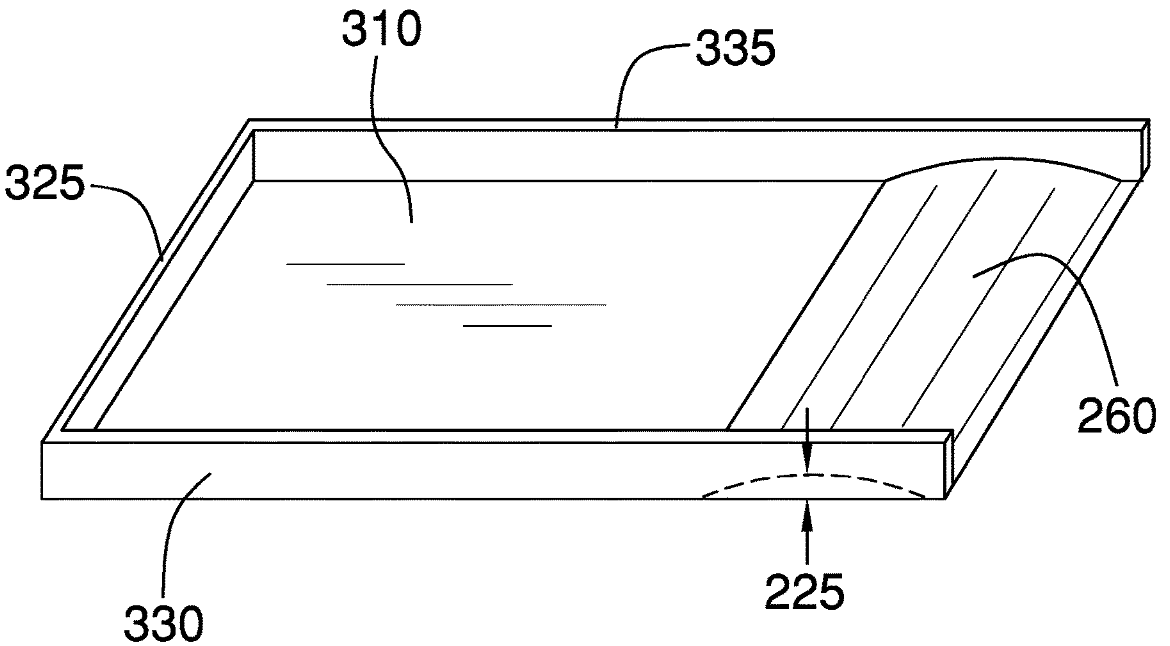
FIG. 6 is a perspective view of an alternative embodiment of the disclosure.
Figure 7:
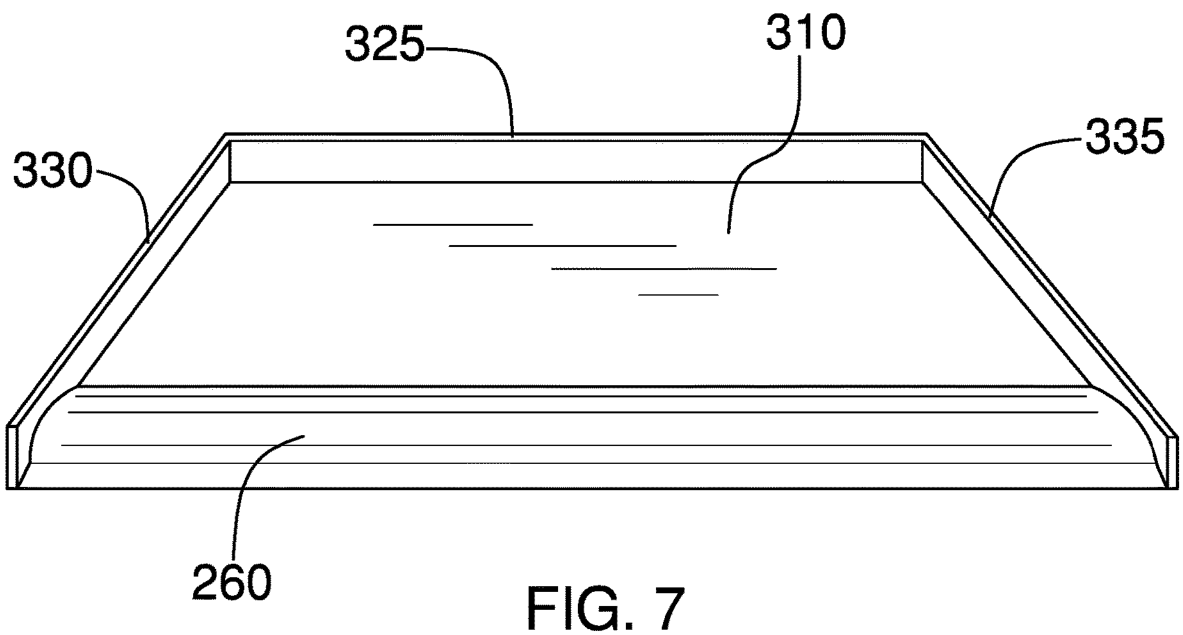
FIG. 7 is a front view of an alternative embodiment of the disclosure.

Detailed reference will now be made to a first potential embodiment of the disclosure, which is illustrated in FIGS. 1 through 7.

The drip tray for a snow blower 100 (hereinafter invention) comprises a drip tray 300 and an entry ramp 200. A snow blower 900 may be parked upon the drip tray 300 when the snow blower 900 is not being used. Accumulated snow and ice on the snow blower 900 may melt forming melt water 910 and the melt water 910 may drip from the snow blower 900 onto the drip tray 300. The drip tray 300 may collect the melt water 910 and prevent it from ruining a building floor 950, walls (not illustrated in the figures), and nearby objects. The entry ramp 200 provides a pathway for the snow blower 900, allowing the snow blower 900 to be moved from the building floor 950 to the drip tray 300.

The invention 100 has a front side 150, a rear side 155, a left side 160, and a right side 165. The drip tray 300 comprises a drip tray floor 310, a drip tray rear side wall 325, a drip tray left side wall 330 and a drip tray right side wall 335. The drip tray rear side wall 325, the drip tray left side wall 330, and the drip tray right side wall 335 rise vertically from the building floor 950 to a maximum side wall height 340. The drip tray rear side wall 325 is located on the rear side 155 of the drip tray 300, the drip tray left side wall 330 is located on the left side 160 of the drip tray 300, and the drip tray right side wall 335 is located on the right side 165 of the drip tray 300.

The rear side 155 of the drip tray floor 310 couples to the drip tray rear side wall 325, the left side 160 of the drip tray floor 310 couples to the drip tray left side wall 330, and the right side 165 of the drip tray floor 310 couples to the drip tray right side wall 335. The highest point of the drip tray floor 310 is below the maximum side wall height 340. The drip tray rear side wall 325, the drip tray left side wall 330, and the drip tray right side wall 335 prevent the melt water 910 from flowing out of the drip tray 300. At the front side 150, the drip tray floor 310 couples to the entry ramp 200.

In some embodiments, the drip tray floor 310 may be parallel to the building floor 950. Such embodiments may depended upon an elevated height along the entry ramp 200 to prevent the melt water 910 from draining out of the front side 150 of the drip tray 300.

In some embodiments the drip tray floor 310 may be fully or partially inclined from being parallel with the building floor 950. As a non-limiting example, the drip tray floor 310 may be inclined from being parallel with the building floor 950 along its entire length by having the drip tray floor 310 lower at the rear side 155 of the drip tray 300 than it is at the front side 150 of the drip tray 300. Such an inclination may cause the melt water 910 to flow towards the rear side 155 of the drip tray 300.

As an additional non-limiting example, the drip tray floor 310 may have an initial inclined section 345 at the front side 150 of the drip tray floor 310 followed by a level section 350 for the remainder of the drip tray floor 310. The initial inclined section 345 may transition the height of the drip tray floor 310 from the level of a rear side of the ramp 220 to a lower level that is higher than the level of the building floor 950. The level section 350 may be level at the height of the lower level and may be parallel to the building floor 950.

In some embodiments, the invention 100 may comprise a plurality of drain holes 315 in the drip tray floor 310 and a water reservoir 320 under the drip tray floor 310. The water reservoir 320 may comprise a cavity within the drip tray 300.

In these embodiments with the plurality of drain holes 315 and the water reservoir 320, the melt water 910 from the snow blower 900 may flow through the plurality of drain holes 315 into the water reservoir 320. The water reservoir 320 may comprise a water reservoir floor 322 and a water reservoir front wall 324 and the water reservoir 320 may utilize the drip tray rear side wall 325, the drip tray left side wall 330, and the drip tray right side wall 335 to contain the melt water 910.

In some embodiments, the water reservoir 320 may comprise a drain aperture 370 and a drain plug 375. The drain aperture 370 may be a resealable opening on the water reservoir front wall 324, on the drip tray rear side wall 325, on the drip tray left side wall 330, or on the drip tray right side wall 335. As a non-limiting example, the drain aperture 370 may be a threaded hole on the drip tray rear side wall 325 which accepts the drain plug 375 to seal the water reservoir 320. The drain plug 375 may comprise a thread which is complimentary to the thread of the drain aperture 370. To drain the melt water 910 from the drip tray 300, the invention 100 may be dragged or carried to a location where it may be emptied, the drain plug 375 may be removed, and the invention 100 may be tilted to allow the melt water 910 to flow out of the drain aperture 370. The drain plug 375 may be returned to the drain aperture 370 and the invention 100 may be placed back at its original location for further use.

In embodiments that do not comprise the plurality of drain holes 315 in the drip tray floor 310 and do not comprise the water reservoir 320 under the drip tray floor 310, the melt water 910 may collect in the drip tray 300 and the drip tray 300 may be emptied by dragging or carrying the invention 100 to a location where it may be emptied and then tilting the invention 100 to allow the melt water 910 to flow out.

The entry ramp 200 comprises a ramp floor 260, a front side of the ramp 210, the rear side of the ramp 220, a left side of the ramp 250 and a right side of the ramp 255. The ramp floor 260 provides a pathway for movement of the snow blower 900 and allows the snow blower 900 to transition from the level of the building floor 950 to the level of the front side 150 of the drip tray floor 310. The entry ramp 200 may be coupled to the drip tray 300. Specifically, the rear side of the ramp 220 may be coupled to the front side 150 of the drip tray floor 310.

The front side of the ramp 210 may be at the level of the building floor 950 to allow for a gradual elevation transition as the snow blower 900 moves from the building floor 950 onto the entry ramp 200. In some embodiments, the rear side of the ramp 220 and the drip tray floor 310 may be at the level of the building floor 950 if the embodiment does not comprise the plurality of drain holes 315 and the water reservoir 320. In those embodiments, the ramp floor 260 may form a hump, meaning that the height of the ramp floor 260 may increase to a maximum height of the ramp 225 which is higher than the level of the front side of the ramp 210 and may then decrease to match the height of the drip tray floor 310. The maximum height of the ramp 225 may therefore occur between the front side of the ramp 210 and the rear side of the ramp 220. The fact that the maximum height of the ramp 225 is higher than the drip tray floor 310 may prevent the melt water 910 that may have collected in the drip tray 300 from flowing out through the front side 150 of the entry ramp 200.

In some embodiments, the rear side of the ramp 220 may be at a higher level than the building floor 950. As a non-limiting example, the entry ramp 200 may be a flat inclined plane that rises linearly from the level of the building floor 950 to the level of the drip tray 300 at the rear side of the ramp 220, thus placing the maximum height of the ramp 225 at the rear side of the ramp 220.

The entry ramp 200 may comprise a ramp left side wall 270 and a ramp right side wall 275. The ramp left side wall 270 and the ramp right side wall 275 may prevent the snow blower 900 from moving off the side of the entry ramp 200 and may prevent the melt water 910 from flowing off the sides of the entry ramp 200. In some embodiments, the ramp left side wall 270 and the ramp right side wall 275 may be continuations of the drip tray left side wall 330 and the drip tray right side wall 335, respectively.

The ramp floor 260 may have a non-slip surface 265. The non-slip surface 265 may comprise an area of roughening, texturing, stamping, applique, or other method of increasing the friction of the ramp floor 260.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A drip tray for a snow blower comprising:

a drip tray and an entry ramp;

wherein a snow blower is parked upon the drip tray when the snow blower is not being used;

wherein accumulated snow and ice on the snow blower melts forming melt water and the melt water drips from the snow blower onto the drip tray;

wherein the drip tray collects the melt water;

wherein the entry ramp provides a pathway for the snow blower, allowing the snow blower to be moved from a building floor to the drip tray;

wherein the drip tray for a snow blower has a front side, a rear side, a left side, and a right side;

wherein the drip tray comprises a drip tray floor, a drip tray rear side wall, a drip tray left side wall and a drip tray right side wall;

wherein the drip tray rear side wall, the drip tray left side wall, and the drip tray right side wall rise vertically from the building floor to a maximum side wall height;

wherein the drip tray rear side wall is located on the rear side of the drip tray;

wherein the drip tray left side wall is located on the left side of the drip tray;

wherein the drip tray right side wall is located on the right side of the drip tray;

wherein the rear side of the drip tray floor couples to the drip tray rear side wall;

wherein the left side of the drip tray floor couples to the drip tray left side wall;

wherein the right side of the drip tray floor couples to the drip tray right side wall;

wherein the highest point of the drip tray floor is below the maximum side wall height;

wherein the drip tray rear side wall, the drip tray left side wall, and the drip tray right side wall prevent the melt water from flowing out of the drip tray;

wherein the front side of the drip tray floor couples to the entry ramp;

wherein the drip tray floor is fully or partially inclined from being parallel with the building floor;

wherein the inclination causes the melt water to flow towards the rear side of the drip tray;

wherein the drip tray floor has an initial inclined section at the front side of the drip tray floor followed by a level section for the remainder of the drip tray floor;

wherein the initial inclined section transitions the height of the drip tray floor from the level of a rear side of the ramp to a lower level that is higher than the level of the building floor;

wherein the level section is level at the height of the lower level and is parallel to the building floor;

wherein the drip tray for a snow blower comprises a plurality of drain holes in the drip tray floor and a water reservoir under the drip tray floor;

wherein the water reservoir comprises a cavity within the drip tray;

wherein the melt water from the snow blower flows through the plurality of drain holes into the water reservoir;

wherein the water reservoir comprises a water reservoir floor and a water reservoir front wall;

wherein the water reservoir utilizes the drip tray rear side wall, the drip tray left side wall, and the drip tray right side wall to contain the melt water.

2. The drip tray for a snow blower according to claim 1 wherein the drip tray floor is parallel to the building floor.

3. The drip tray for a snow blower according to claim 2 wherein an elevated height along the entry ramp prevents the melt water from draining out of the front side of the drip tray.

4. The drip tray for a snow blower according to claim 1 wherein the water reservoir comprises a drain aperture and a drain plug;

wherein the drain aperture is a resealable opening on the water reservoir front wall, on the drip tray rear side wall, on the drip tray left side wall, or on the drip tray right side wall.

5. The drip tray for a snow blower according to claim 4 wherein the drain aperture is a threaded hole on the drip tray rear side wall which accepts the drain plug to seal the water reservoir;

wherein the drain plug comprises a thread which is complimentary to the thread of the drain aperture.

6. The drip tray for a snow blower according to claim 1 wherein the entry ramp comprises a ramp floor, a front side of the ramp, the rear side of the ramp, a left side of the ramp and a right side of the ramp;

wherein the ramp floor provides a pathway for movement of the snow blower and allows the snow blower to transition from the level of the building floor to the level of the front side of the drip tray floor.

7. The drip tray for a snow blower according to claim 6 wherein the rear side of the ramp is coupled to the front side of the drip tray floor.

8. The drip tray for a snow blower according to claim 7 wherein the front side of the ramp is at the level of the building floor to allow for an elevation transition as the snow blower moves from the building floor onto the entry ramp.

9. The drip tray for a snow blower according to claim 8 wherein the ramp floor forms a hump;

wherein the maximum height of the ramp occurs between the front side of the ramp and the rear side of the ramp;

wherein the maximum height of the ramp is higher than the drip tray floor, preventing the melt water that has collected in the drip tray from flowing out through the front side of the entry ramp.

10. The drip tray for a snow blower according to claim 8 wherein the rear side of the ramp is at a higher level than the building floor.

11. The drip tray for a snow blower according to claim 10 wherein the entry ramp is a flat inclined plane that rises linearly from the level of the building floor to the level of the drip tray at the rear side of the ramp, thus placing the maximum height of the ramp at the rear side of the ramp.

12. The drip tray for a snow blower according to claim 8 wherein the entry ramp comprises a ramp left side wall and a ramp right side wall;

wherein the ramp left side wall and the ramp right side wall prevents the snow blower from moving off the side of the entry ramp and prevents the melt water from flowing off the sides of the entry ramp.

13. The drip tray for a snow blower according to claim 12 wherein the ramp left side wall and the ramp right side wall are continuations of the drip tray left side wall and the drip tray right side wall, respectively.

14. The drip tray for a snow blower according to claim 12 wherein the ramp floor has a non-slip surface;

wherein the non-slip surface comprises an area of increased friction on the ramp floor.

* * * * *